United States Patent
Marple (10) Patent No.: US 9,200,443 B2
(45) Date of Patent: Dec. 1, 2015

(54) STRUCTURAL ATTACHMENT SYSTEM

(71) Applicant: Travis Cole Marple, Modesto, CA (US)

(72) Inventor: Travis Cole Marple, Modesto, CA (US)

(73) Assignee: Ezekiel Building Systems LLC, Modesto, CA (US)

( * ) Notice: Subject to any disclaimer, the term of this patent is extended or adjusted under 35 U.S.C. 154(b) by 0 days.

(21) Appl. No.: 14/578,118

(22) Filed: Dec. 19, 2014

(65) Prior Publication Data

US 2015/0225940 A1 Aug. 13, 2015

Related U.S. Application Data

(60) Provisional application No. 61/939,085, filed on Feb. 12, 2014.

(51) Int. Cl.
*E04B 2/60* (2006.01)
*E04B 1/38* (2006.01)
*E04B 1/24* (2006.01)

(52) U.S. Cl.
CPC ........... *E04B 2/60* (2013.01); *E04B 2001/2415* (2013.01); *E04B 2001/2475* (2013.01); *E04B 2001/2481* (2013.01); *E04B 2001/405* (2013.01)

(58) Field of Classification Search
CPC ....... E04C 2/00; E04B 1/40; E04B 2001/405; E04B 2001/2415; E04B 2001/2448; E04B 2/60
USPC ............ 52/582.1, 582.2, 584.1, 589.1, 656.9, 52/167.1, 167.3, 638; 403/231; 49/501, 49/504
See application file for complete search history.

(56) References Cited

U.S. PATENT DOCUMENTS

| | | | | |
|---|---|---|---|---|
| 1,465,443 A | * | 8/1923 | Josler | 49/56 |
| 2,690,073 A | * | 9/1954 | McLaughlin | 49/383 |
| 3,263,388 A | * | 8/1966 | Bogert | 52/665 |
| 3,451,183 A | * | 6/1969 | Lespagnol et al. | 52/656.1 |
| 3,800,489 A | * | 4/1974 | Boice | 52/208 |
| 3,837,128 A | * | 9/1974 | O'Brien | 52/241 |
| 3,841,049 A | * | 10/1974 | Boice | 52/745.15 |
| 3,925,939 A | * | 12/1975 | Costruba | 52/36.6 |
| 3,989,399 A | * | 11/1976 | Slowbe | 403/245 |

(Continued)

FOREIGN PATENT DOCUMENTS

| | | | | |
|---|---|---|---|---|
| CN | 201234753 Y | | 5/2009 | |
| DE | EP 1441081 | * | 7/2004 | ................ E04B 1/58 |
| EP | 1780345 A2 | | 5/2007 | |

OTHER PUBLICATIONS

Machine Translation of EP1441081, Connector for Profiles and Connector Assembly, May 29, 2015, ESPACENET.*

*Primary Examiner* — Joshua J Michener
*Assistant Examiner* — Alp Akbasli
(74) *Attorney, Agent, or Firm* — Plager Schack LLP (57) ABSTRACT

Some embodiments of the present disclosure include a structural attachment system for easily and quickly erecting a structure. The structural attachment system may include a hollow tube unit having at least one T-slot positioned between a pair of square slots configured to engage with a unit connector. The unit connector may include a T-unit sandwiched between a pair of composition units and a pair of locking plates. The T-unit may have a first unit T-tab configured to engage with the T-slot on the hollow tube unit, and the locking plates may engage with the square slots, resulting in the unit connector being slidably fastened to the hollow tube unit. Paneling may also be attached to the hollow tube unit to create walls, a roof, and flooring.

9 Claims, 7 Drawing Sheets

(56) References Cited

U.S. PATENT DOCUMENTS

| | | | |
|---|---|---|---|
| 4,347,015 A * | 8/1982 | Olashaw | 403/219 |
| 4,677,794 A * | 7/1987 | Parron et al. | 52/36.4 |
| 4,976,757 A * | 12/1990 | Helmus | 55/355 |
| 5,077,951 A * | 1/1992 | Baker | 52/506.07 |
| 5,116,161 A * | 5/1992 | Faisst | 403/231 |
| 5,231,908 A * | 8/1993 | Skvarce et al. | 83/699.11 |
| 5,263,296 A * | 11/1993 | Spera | 52/638 |
| 5,279,090 A * | 1/1994 | Yamaguchi et al. | 52/506.08 |
| 5,634,300 A | 6/1997 | Huebner et al. | |
| 6,073,405 A * | 6/2000 | Kasai et al. | 52/283 |
| 6,141,926 A * | 11/2000 | Rossiter et al. | 52/239 |
| 6,387,533 B1 * | 5/2002 | Ast et al. | 428/582 |
| 6,481,177 B1 | 11/2002 | Wood | |
| 6,516,583 B1 * | 2/2003 | Houghton | 52/655.1 |
| 7,260,919 B1 * | 8/2007 | Spransy et al. | 52/586.1 |
| 7,293,394 B2 * | 11/2007 | Davis | 52/838 |
| 7,555,873 B2 * | 7/2009 | Kilwin et al. | 52/838 |
| 7,677,830 B1 * | 3/2010 | Brown | 403/381 |
| 7,716,884 B2 * | 5/2010 | Jaycox | 52/203 |
| 7,886,496 B1 * | 2/2011 | Spransy | 52/506.06 |
| 8,282,307 B1 * | 10/2012 | Brown | 403/205 |
| 8,365,476 B2 * | 2/2013 | Richard et al. | 52/167.1 |
| 8,453,387 B2 * | 6/2013 | Goepfert et al. | 52/36.5 |
| 8,850,762 B2 * | 10/2014 | Knauf et al. | 52/217 |
| 8,910,455 B2 * | 12/2014 | Yang | 52/841 |
| 9,004,715 B1 * | 4/2015 | Litke et al. | 362/218 |
| 2003/0009977 A1 * | 1/2003 | Houghton | 52/656.9 |
| 2004/0051005 A1 * | 3/2004 | Bergmann | 244/133 |
| 2004/0079038 A1 * | 4/2004 | Crooker, Jr. | 52/235 |
| 2009/0256046 A1 * | 10/2009 | Hausner et al. | 248/398 |
| 2011/0138732 A1 * | 6/2011 | Piano | 52/656.2 |
| 2011/0138735 A1 * | 6/2011 | Foley | 52/699 |
| 2013/0284706 A1 * | 10/2013 | Kral et al. | 219/55 |

* cited by examiner

STRUCTURAL ATTACHMENT SYSTEM

RELATED APPLICATION

This application claims priority to provisional patent application U.S. Ser. No. 61/939,085 filed on Feb. 12, 2014, the entire contents of which is herein incorporated by reference.

BACKGROUND

The embodiments herein relate generally to construction, and more particularly, to structural connection devices for easily and quickly erecting a structure.

Conventional structural attachments related to nails, screws, bolts, gussets, glue, concrete, composites, brazing, and welding. Unfortunately, such attachments have limited themselves to specific materials, such as wood, steel, plastics, and other composites providing difficult relating to mass production, low cost, low weight, and ease of fabrication. Conventional fasteners or attachments also have consistent difficulties as to certain deterioration properties relative to rust, water, mildew, insects, fire, and caustics, which in turn lead to shortened life use.

Therefore, what is needed is a structural attachment system for easily and quickly erecting a structure that provides long-term and consistent system sustainability.

SUMMARY

Some embodiments of the present disclosure include a structural attachment system for easily and quickly erecting a structure. The structural attachment system may include a hollow tube unit having at least one T-slot positioned between a pair of square slots configured to engage with a unit connector. The unit connector may include a T-unit sandwiched between a pair of composition units and a pair of locking plates. The T-unit may have a first unit T-tab configured to engage with the T-slot on the hollow tube unit, and the locking plates may engage with the square slots, resulting in the unit connector being slidably fastened to the hollow tube unit. Paneling may also be attached to the hollow tube unit to create walls, a roof, and flooring.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

In the following detailed description of the invention, numerous details, examples, and embodiments of the invention are described. However, it will be clear and apparent to one skilled in the art that the invention is not limited to the embodiments set forth and that the invention can be adapted for any of several applications.

The devices of the present disclosure may be used to easily and quickly erect a structure and may comprise the following elements. This list of possible constituent elements is intended to be exemplary only, and it is not intended that this list be used to limit the devices of the present application to just these elements. Persons having ordinary skill in the art relevant to the present disclosure may understand there to be equivalent elements that may be substituted within the present disclosure without changing the essential function or operation of the device.

1. Hollow Tube Unit with T-Slots and Square Slots
2. T-Units
3. Composition Plates
4. Locking Plates The various elements of the structural connection devices for easily and quickly erecting a structure of the present disclosure may be related in the following exemplary fashion. It is not intended to limit the scope or nature of the relationships between the various elements and the following examples are presented as illustrative examples only.

Figures 1, 2:
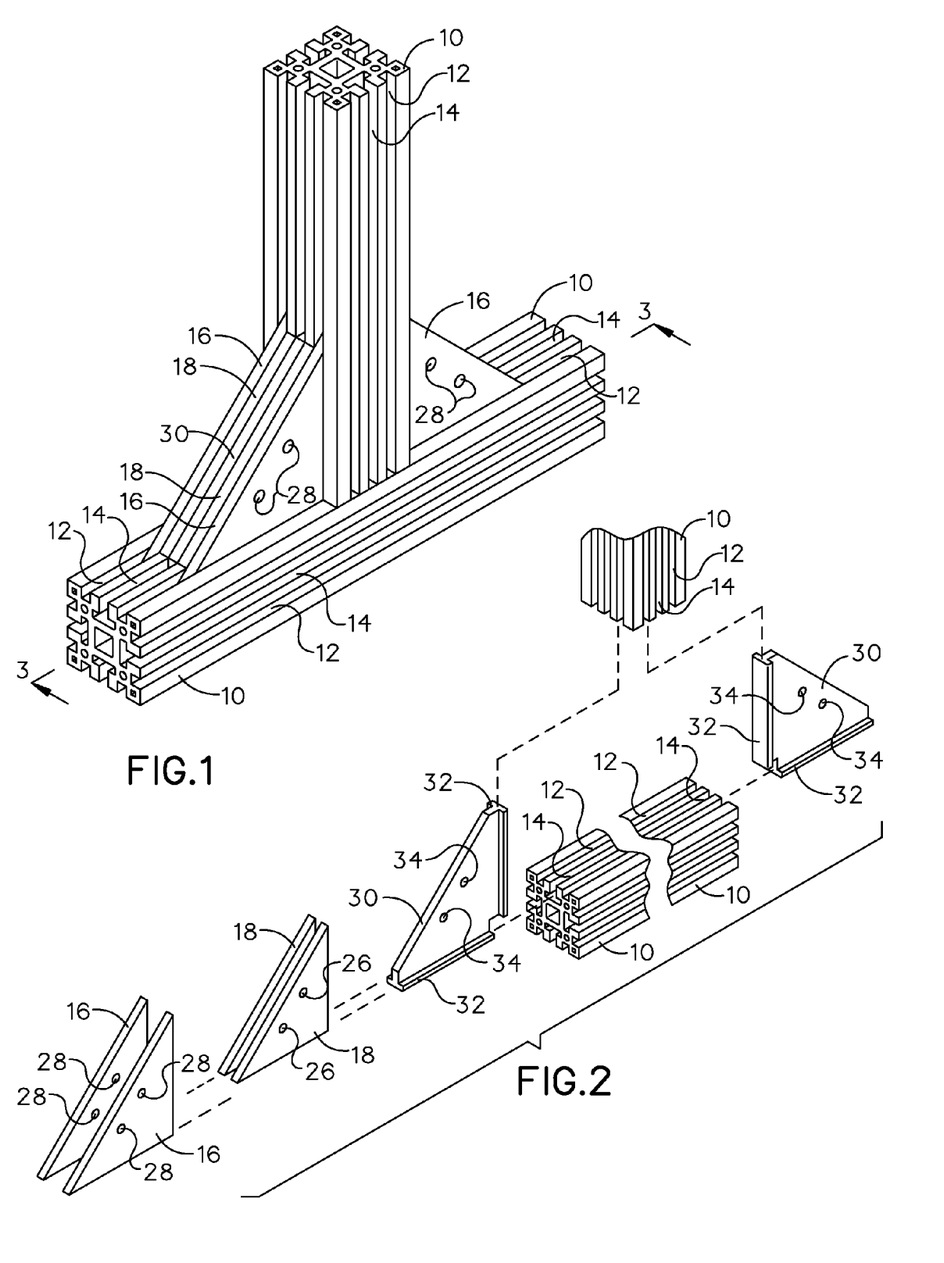
FIG. 1 is a perspective view of one embodiment of the present invention.
FIG. 2 is an explode view of one embodiment of the present invention.
Figure 3:
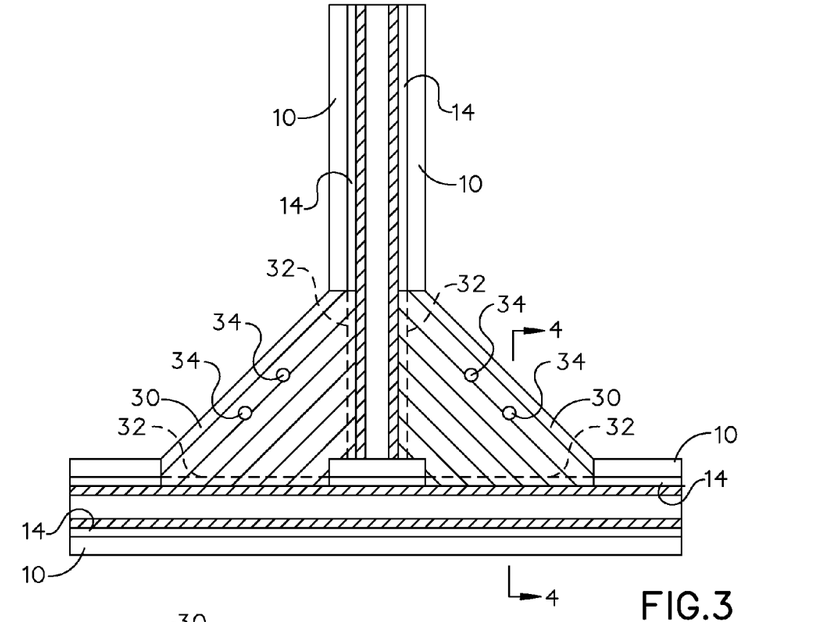
FIG. 3 is a section view of one embodiment of the present invention, taken along line 3-3 in FIG. 1.
Figure 4:
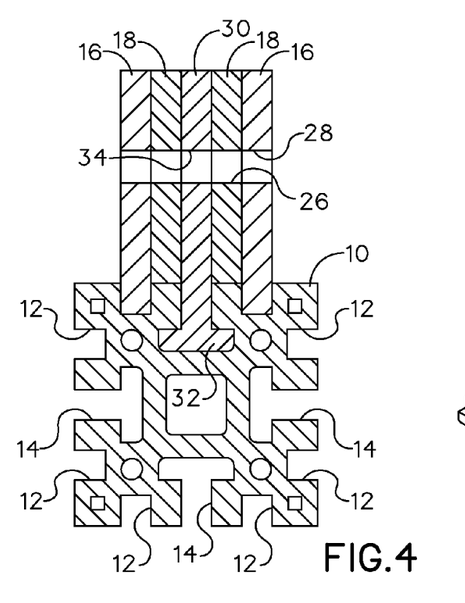
FIG. 4 is a section view of one embodiment of the present invention, taken along line 4-4 in FIG. 3.
Figure 5:
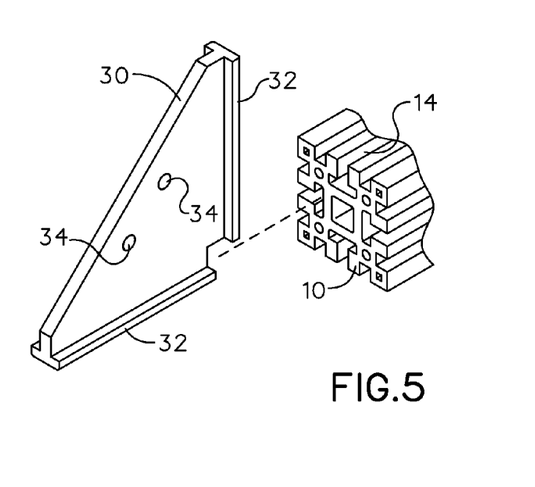
FIG. 5 is a detail exploded view of one embodiment of the present invention.
Figures 6, 7:
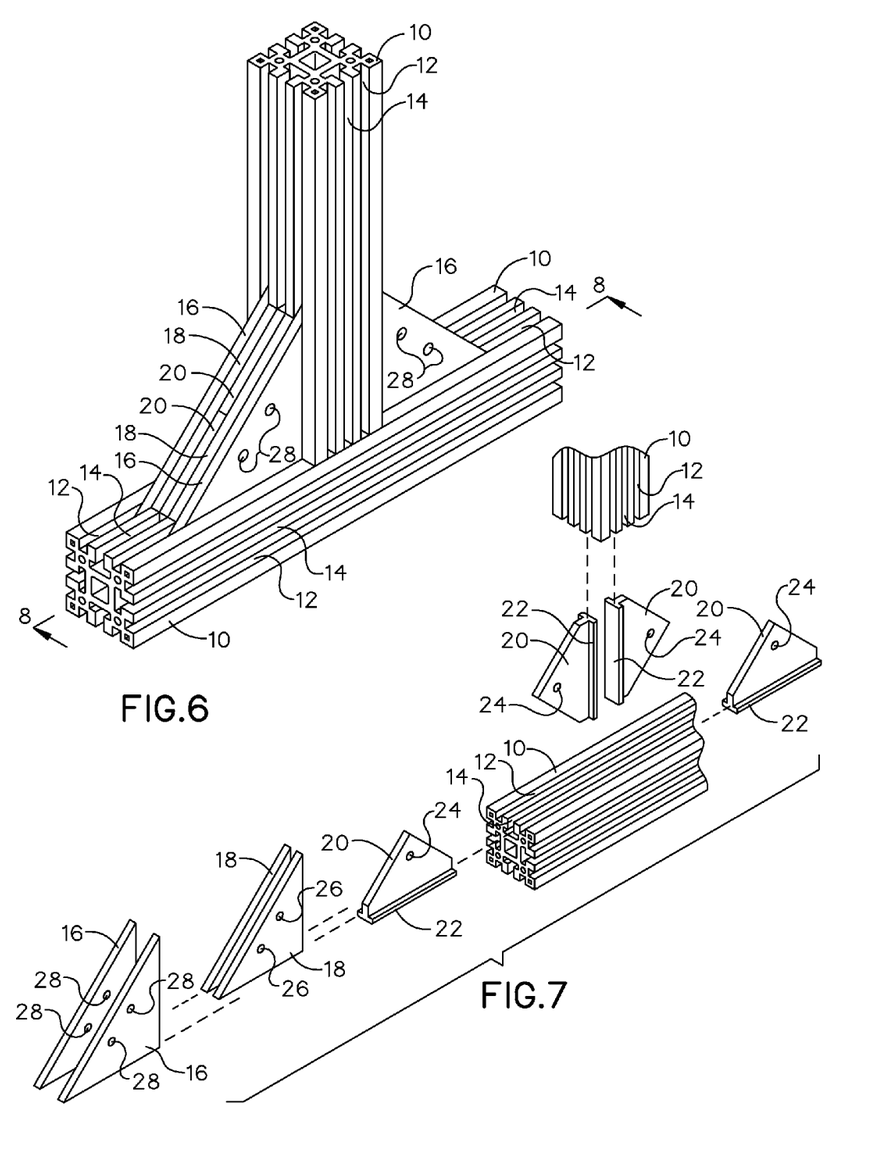
FIG. 6 is a perspective view of one embodiment of the present invention.
FIG. 7 is an exploded view of one embodiment of the present invention.
Figure 8:
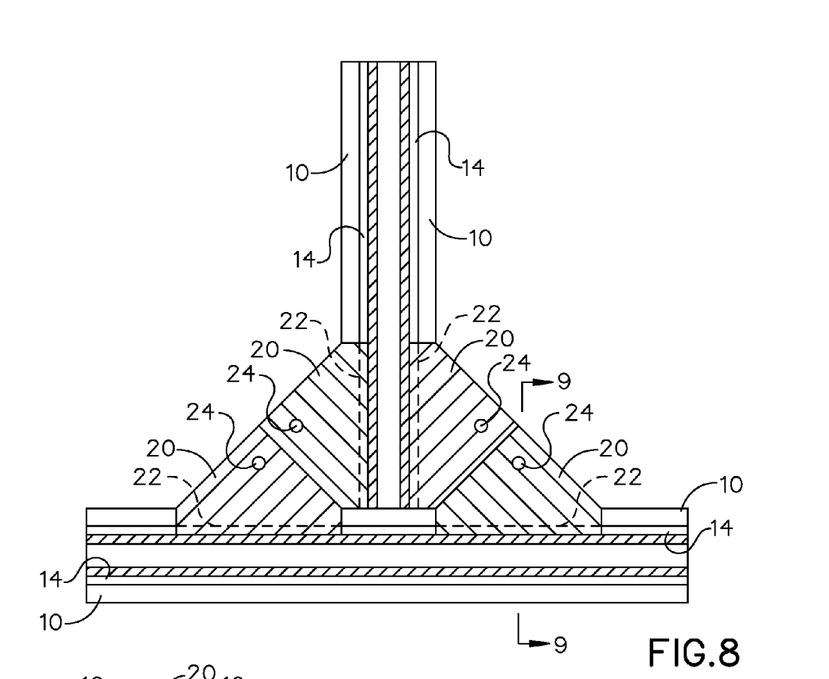
FIG. 8 is a section view taken along line 8-8 in FIG. 6.
Figure 9:
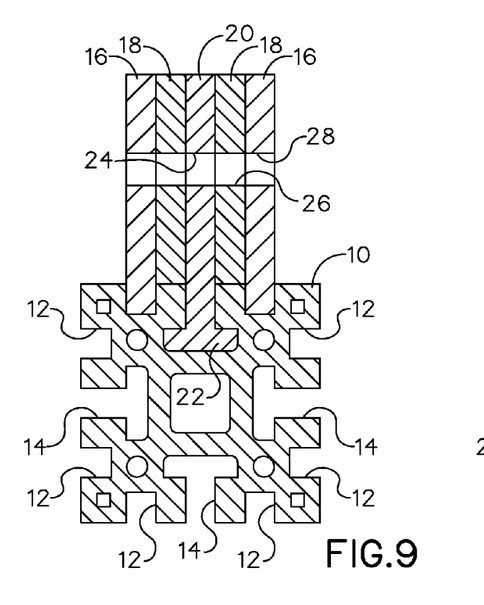
FIG. 9 is a section view taken along line 9-9 in FIG. 8.
Figure 10:
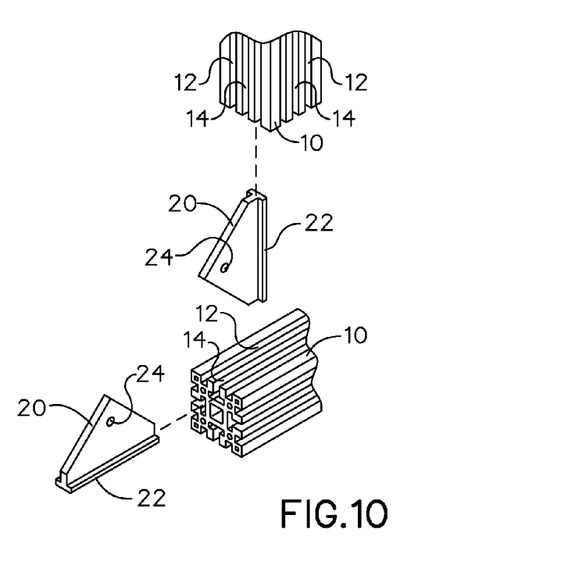
FIG. 10 is a detail exploded view of one embodiment of the present invention.

By way of example, and referring to FIGS. 1-20, some embodiments of the structural attachment system of the present disclosure comprise a hollow tube unit 10 comprising at least one T-slot 14 positioned between a pair of square slots 12 and a unit connector comprising a T-unit 30 sandwiched between a pair of composition units 18 and a pair of locking plates 16, wherein the T-unit 30 may be a substantially triangularly shaped piece having at least one edge comprising a T-tab (for example, unit T-tab 32), such that the unit connector comprises, in order, a first locking plate 16, a first composition unit 18, the T-unit 30, a second composition unit 18, and a second locking plate 16, as shown in FIGS. 1 and 2, wherein the T-unit 30 comprises a unit T-tab 32 configured to engage with the T-slot 14 on the hollow tube unit 10 an the locking plates 16 are configured to engage with the square slots 12, resulting in the unit connector being securely fastened to the hollow tube unit 10. As shown in the figures, the unit connector may be substantially triangular in shape with a right angle to create a 90 degree angle between two hollow tub units 10, wherein the T-unit 30 comprises a first unit T-tab 32 configured to engage with the T-slot 14 on a first hollow tube unit 10 and a second unit T-tab 32 configured to engage with the T-slot 14 on a second hollow tune unit 10. Alternatively, the unit connector may be other shapes to connect adjacent hollow tube units 10 at varying angles.

As shown in FIGS. 1-5, the T-unit 30 may be a singular piece wherein two edges of the T-unit comprise T-tabs 32. Alternatively, as shown in FIGS. 6-10, the T-unit may comprise a plurality of T-unit pieces 20, which together form the desired shape T-unit. For example, as shown in FIGS. 6-10, the T-unit may comprise a pair of T-unit pieces 20, each T-unit piece comprising a T-tab 22 configured to engage with a T-slot 14 on a hollow tube unit 10.

The unit connectors may also comprise at least one fastener orifice, such as a pair of fastener orifices, extending therethrough, the at least one fastener orifice being configured to engage with a fastener to help secure the unit connector in place, locking the hollow tube units 10 in their desired configurations. To form a fastener orifice in the unit connector, the locking plate 16 may comprise a locking plate fastener orifice 28, the composition unit 18 may comprise a composition unit fastener orifice 26 and the T-unit 30, 20 may comprise a T-unit fastener orifice 34, 24, wherein the orifices are all concentrically aligned, creating the fastener orifice in the unit connector.

Figure 11:
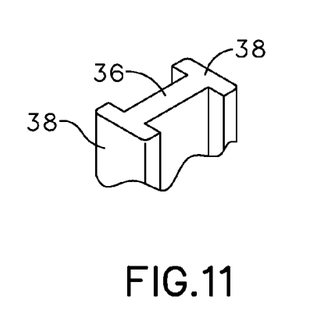
FIG. 11 is a perspective view of one aspect of one embodiment of the present invention.
Figure 12:
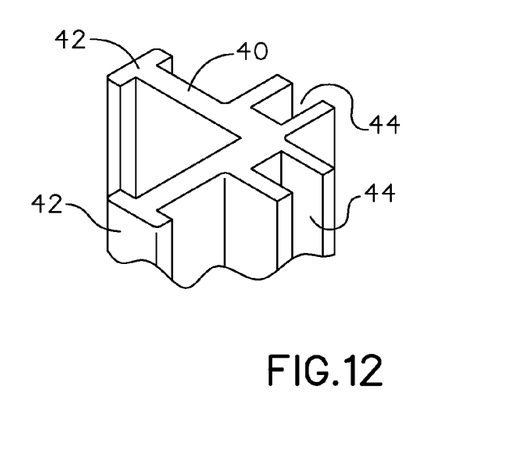
FIG. 12 is a perspective view of one aspect of one embodiment of the present invention.
Figure 13:
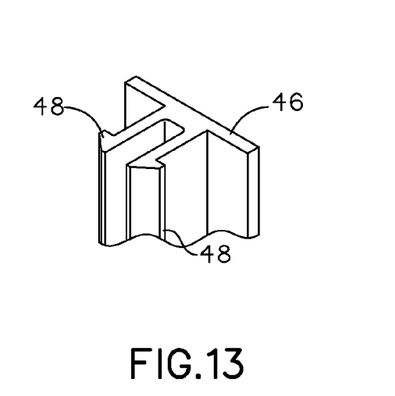
FIG. 13 is a perspective view of one aspect of one embodiment of the present invention.
Figure 14:
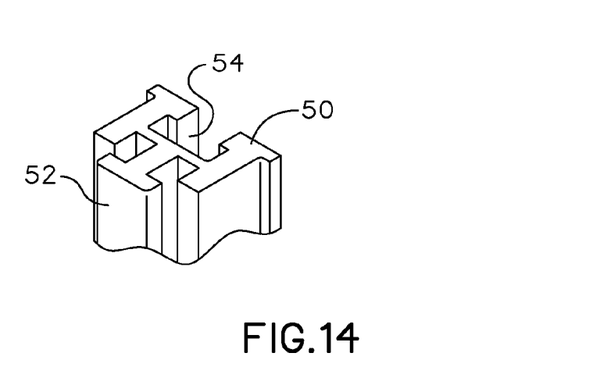
FIG. 14 is a perspective view of one aspect of one embodiment of the present invention.
Figure 15:
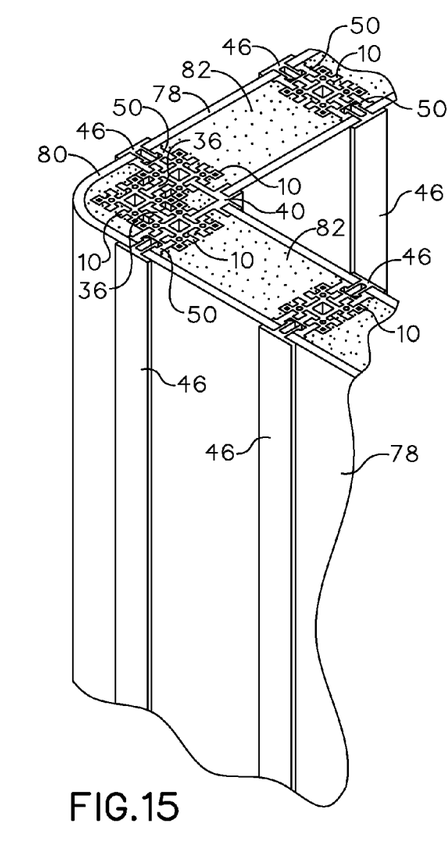
FIG. 15 is a perspective view of one embodiment of the present invention.
Figure 16:
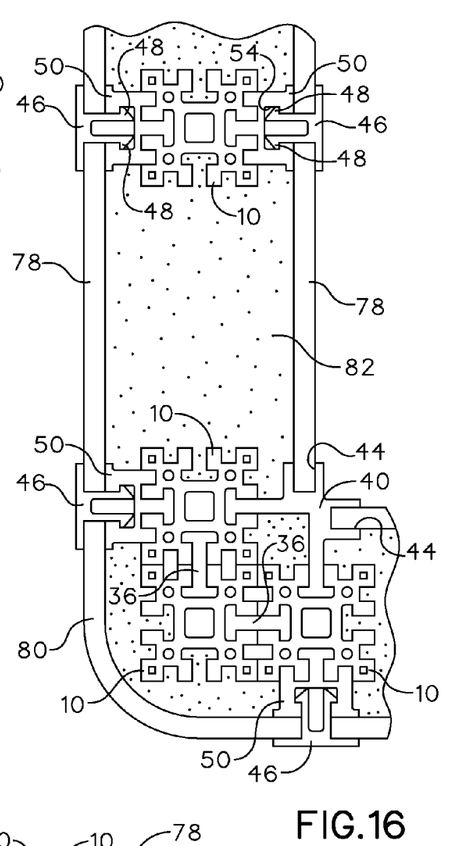
FIG. 16 is a top view of one embodiment of the present invention.
Figure 17:
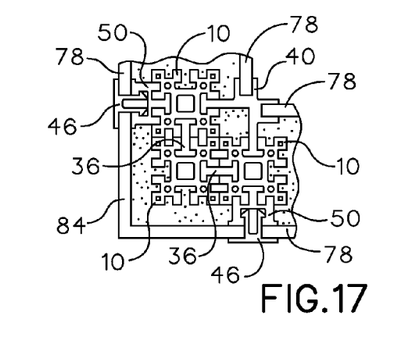
FIG. 17 is a top view of one embodiment of the present invention.

As described above and a shown in FIGS. 11 and 12 the unit connector may exist in alternative shapes, depending on the orientation of two hollow tube units 10 to be connected. For example, as shown in FIG. 11, the unit connector may comprise an interlocking double T unit 36 comprise a pair of interlocking T-tabs 38, wherein each of the T-tabs 38 is configured to engage with a T-slot 14 on a hollow tube unit 10. In another embodiments, the unit connector may comprise a corner connecting unit 40 comprising a pair of corner unit T-tabs 42 positioned at approximately a 90 degree angle relative to one another and a pair of panel slots 44, wherein the panel slots 44 are configured to accommodate a panel, such as a straight paneling unit 78, a curved corner paneling unit 80, a straight corner paneling unit 84, or the like, as shown in FIGS. 15-17. A snap in holding unit 46, shown in FIG. 13, engaged with a locking unit 50, shown in FIG. 14, may help secure adjacent paneling units to one another, as shown in FIGS. 15-17. The snap in holding unit 46 may comprise a pair of prongs 48 configured to engage with a locking unit slot 54 on the locking unit 50. The locking unit 50 may also comprise a locking unit T-tab 52 configured to engage with a T-slot 14 on a hollow tube unit 10. Paneling may be configured to engage with a space created by the engagement of the snap in holding unit 46 and the locking unit 50.

Thus, as shown in FIGS. 15-17, hollow tube units 10 may be configured to engage with one another and also with corner connecting units 40, snap in holding units 46, and locking units 50 to attach a plurality of panels to one another, creating walls wherein, wherein the walls may comprise, for example, a plurality of straight paneling units 78, curved corner paneling units 80, straight corner paneling units 84, or the like with a material barrier/insulation 82 sandwiched between a pair of panels.

Figures 18, 19, 20:
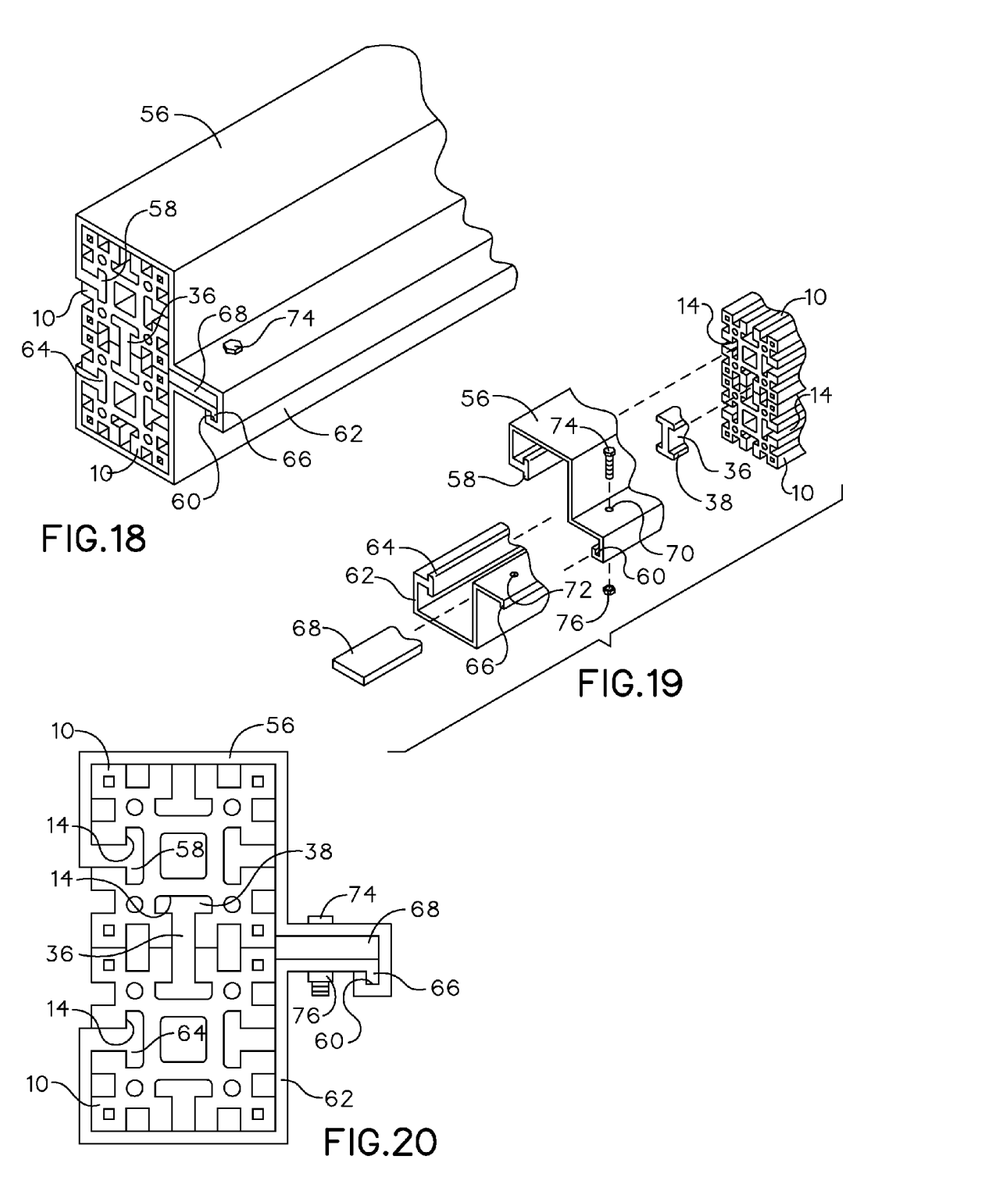
FIG. 18 is a perspective view of one embodiment of the present invention.
FIG. 19 is an exploded view of one embodiment of the present invention.
FIG. 20 is a perspective view of one embodiment of the present invention.

FIGS. 18-20 illustrate an alternative embodiments wherein adjacent hollow tube units 10 may be attached by connecting a first sliding clamp unit 56 to a second sliding clamp unit 62 using a fastener, such as a bolt 74 and nut 76, which passes through a first clamp hole 70 and a second clamp hole 72 to attach the two sliding clamp units 56, 62 together. The first sliding clamp unit 56 may comprise a first clamp T-tab 58 configured to engage with a T-slot 14 in the first hollow tube unit 10 and the second sliding clamp unit 62 may comprise a second clamp T-tab 64 configured to engage with a T-slot 14 in the second hollow tube unit 10, wherein each of the sliding clamp units 56, 62 wrap partially around the circumference of its respective hollow tube unit 10 and meet at a side of the hollow tube units 10 that is opposite the first and second clamp T-tabs 58, 64, engaging with one another via a first clamp slot 60 engaging with a second clamp tab 66, wherein a clamp composition unit 68 may be positioned in the open space between the two sliding clamp units 56, 62.

In embodiments, and as shown in the figures, the hollow tube unit 10 may have a substantially square-shaped cross section with, for example, four sides comprising T-slots 14 and square slots 12. Alternatively, the hollow tub unit 10 may have any desired cross-sectional shape, such as a triangle, a pentagon, hexagon, heptagon, octagon, or the like, wherein each side may comprise the T-slots 14 and square slots 12. The structural attachment system may be made of any desired materials and, in some embodiments, is made of a metal, plastic, or other construction material suitable to provide structural integrity as required to meet national and international building code requirements.

To use the structure attachment system of the present disclosure, a user may attach a first hollow unit tube 10 to a second hollow unit tube 10 using a sliding connecting unit, which includes a locking plate 16 to prevent the hollow unit tubes 10 from sliding relative to one another. The user may then connect paneling units to the hollow unit tubes 10 by using, for example, a snap in holding unit 46 and a locking unit 50, creating a structure with a wall, roof, and floor in an efficient manner.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A structural attachment system for easily and quickly erecting a structure, the structural attachment system comprising:
   a hollow tube unit comprising at least one T-slot positioned between a pair of square slots; and
   a unit connector comprising a T-unit sandwiched between a pair of composition units and a pair of locking plates, wherein:
     a first outer edge of the T-unit comprises a first unit T-tab;
     each of the pair of locking plates comprises a plate outer edge;
     each of the pair of composition units comprises a composition outer edge;
     the first unit T-tab extends a largest distance outward from a central portion of the unit connector, each of the composition outer edges extends a shortest distance outward from the central portion of the unit connector, and each of the plate outer edges extend a distance outward from the central portion of the unit connector between the largest distance and the shortest distance;
     the first unit T-tab is configured to engage with the T-slot on the hollow tube unit; and
     the locking plates are configured to engage with the square slots, resulting in the unit connector being slidably fastened to the hollow tube unit.

2. The structural attachment system of claim 1, further comprising a second hollow tube unit comprising at least one T-slot positioned between a pair of square slots, the second hollow tube unit configured to engage with a second unit T-tab on the T-unit and with the locking plates, such that the first hollow tube unit is attached to the second hollow tube unit.

3. The structural attachment system of claim 1, wherein the unit connector comprises, in order, a first locking plate, a first composition unit, the T-unit, a second composition unit, and a second locking plate.

4. The structural attachment system of claim 3, wherein:
the unit connector comprises at least one fastener orifice extending through the locking plates, the composition units, and the T-unit; and the fastener orifice is configured to accommodate a fastener, which is configured to secure the first locking plate, the second locking plate, the composition units, and the T-unit together.

5. The structural attachment system of claim 1, wherein the T-unit comprises a pair of T-unit pieces which together form the T-unit.

6. The structural attachment system of claim 1, further comprising a panel attached to the hollow tube unit, forming a portion of a wall.

7. The structural attachment system of claim 6, further comprising:
a locking unit comprising a locking unit slot and a locking unit T-tab, the locking unit T-tab configured to engage with the T-slot on the hollow tube unit; and a snap in holding unit comprising a pair of prongs configured to engage with the locking unit slot on the locking unit, wherein the panel is configured to engage with a space created by the engagement of the snap in holding unit and the locking unit.

8. The structural attachment system of claim 6, further comprising:
a corner connecting unit comprising a pair of corner unit T-tabs and a pair of panel slots, wherein the panel slots are configured to accommodate a panel.

9. The structural attachment system of claim 8, wherein the panel comprises at least one member selected from the group consisting of a straight paneling unit, a curved corner paneling unit, and a straight corner paneling unit.

\* \* \* \* \*